United States Patent
Sheinfeld et al.

(10) Patent No.: US 8,018,862 B2
(45) Date of Patent: Sep. 13, 2011

(54) PROBES FOR PREDICTIVE DETERMINATION OF CONGESTION BASED ON REMARKING/DOWNGRADING OF PACKETS

(75) Inventors: Gil Mati Sheinfeld, Sunnyvale, CA (US); Andrew John Ballantyne, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 620 days.

(21) Appl. No.: 11/687,330

(22) Filed: Mar. 16, 2007

(65) Prior Publication Data

US 2008/0225704 A1 Sep. 18, 2008

(51) Int. Cl.
*H04L 12/26* (2006.01)
*H04L 12/28* (2006.01)
*H04L 12/56* (2006.01)

(52) U.S. Cl. .................. 370/248; 370/254; 370/389
(58) Field of Classification Search .................. None
See application file for complete search history.

(56) References Cited

U.S. PATENT DOCUMENTS

| | | | | |
|---|---|---|---|---|
| 6,363,053 B1* | 3/2002 | Schuster et al. | ............. | 370/230 |
| 6,542,466 B1* | 4/2003 | Pashtan et al. | ................ | 370/235 |
| 6,683,853 B1* | 1/2004 | Kannas et al. | ................ | 370/237 |
| 6,735,175 B1* | 5/2004 | Havens | ......................... | 370/236 |
| 6,765,904 B1* | 7/2004 | Anandakumar et al. | ....... | 370/389 |
| 6,947,385 B2* | 9/2005 | Havens | ......................... | 370/236 |
| 7,020,143 B2* | 3/2006 | Zdan | ......................... | 370/395.21 |
| 7,023,802 B2* | 4/2006 | Kawahata et al. | ............ | 370/235 |
| 7,133,368 B2* | 11/2006 | Zhang et al. | ................... | 370/249 |
| 7,209,458 B2* | 4/2007 | Ahvonen et al. | .............. | 370/328 |
| 7,224,679 B2* | 5/2007 | Solomon et al. | .............. | 370/338 |
| 7,275,103 B1* | 9/2007 | Thrasher et al. | .............. | 709/224 |
| 7,277,948 B2* | 10/2007 | Igarashi et al. | ............... | 709/227 |
| 7,321,554 B1* | 1/2008 | Walsh et al. | .................. | 370/230 |
| 7,415,241 B2* | 8/2008 | Oprescu-Surcobe et al. | ............................ | 455/3.05 |
| 7,546,379 B2* | 6/2009 | Bess et al. | ..................... | 709/240 |
| 7,551,568 B2* | 6/2009 | Jeong et al. | ................... | 370/252 |
| 7,599,290 B2* | 10/2009 | Dos Remedios et al. | .. | 370/230.1 |
| 7,733,881 B2* | 6/2010 | Niska et al. | ................... | 370/400 |
| 7,916,691 B2* | 3/2011 | Kopplin | ........................ | 370/329 |
| 2001/0013067 A1* | 8/2001 | Koyanagi et al. | ............. | 709/230 |
| 2002/0163936 A1* | 11/2002 | Kroninger et al. | ............. | 370/468 |
| 2004/0044749 A1* | 3/2004 | Harkin | ............................ | 709/219 |
| 2004/0184446 A1* | 9/2004 | Havens | ......................... | 370/352 |
| 2005/0111487 A1* | 5/2005 | Matta et al. | ................... | 370/468 |
| 2006/0221903 A1* | 10/2006 | Kauranen et al. | .............. | 370/331 |
| 2007/0183416 A1* | 8/2007 | Gooch et al. | .................. | 370/389 |
| 2008/0013470 A1* | 1/2008 | Kopplin | ........................ | 370/310 |
| 2008/0034052 A1* | 2/2008 | Bess et al. | ..................... | 709/207 |
| 2008/0037572 A1* | 2/2008 | Sebire et al. | .................. | 370/412 |
| 2008/0212583 A1* | 9/2008 | Rey et al. | ...................... | 370/390 |

* cited by examiner

*Primary Examiner* — Gregory B Sefcheck
(74) *Attorney, Agent, or Firm* — Patterson & Sheridan, LLP

(57) ABSTRACT

In one embodiment, a technique for detecting the re-marking of a parameter in a network packet is provided. The technique involves sending a request packet that contains a first value of a type of service parameter effecting how the packet is to be handled relative to other packets and receiving a response packet to the request packet, the response packet containing an indication of a second value of the type of service parameter in the request packet as received by a network device that sent the response packet. The first and second values of the type of service parameter are compared. A determination that the request packet was re-marked is made if the first and second values of the type of service parameter do not match.

22 Claims, 7 Drawing Sheets

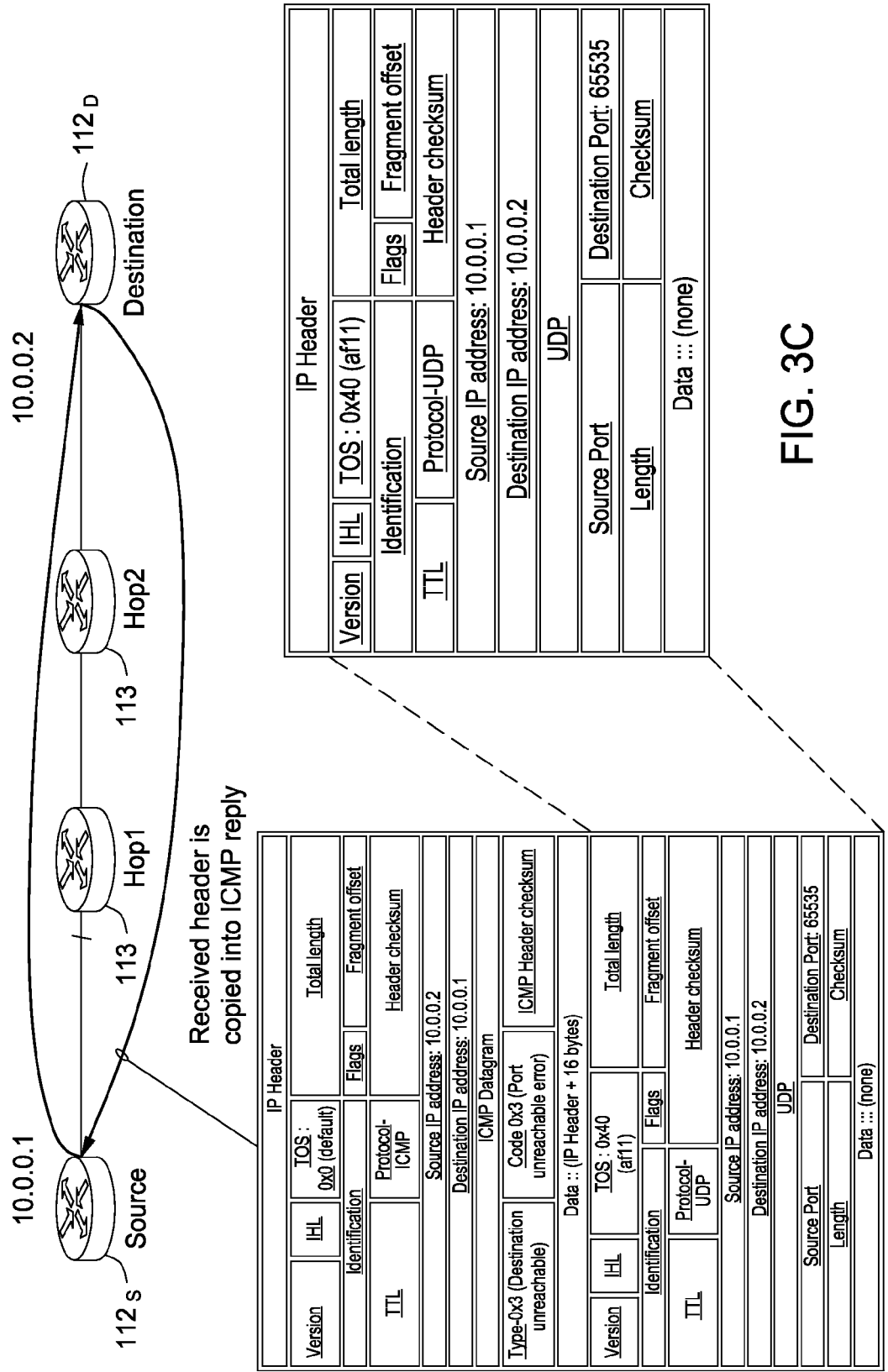

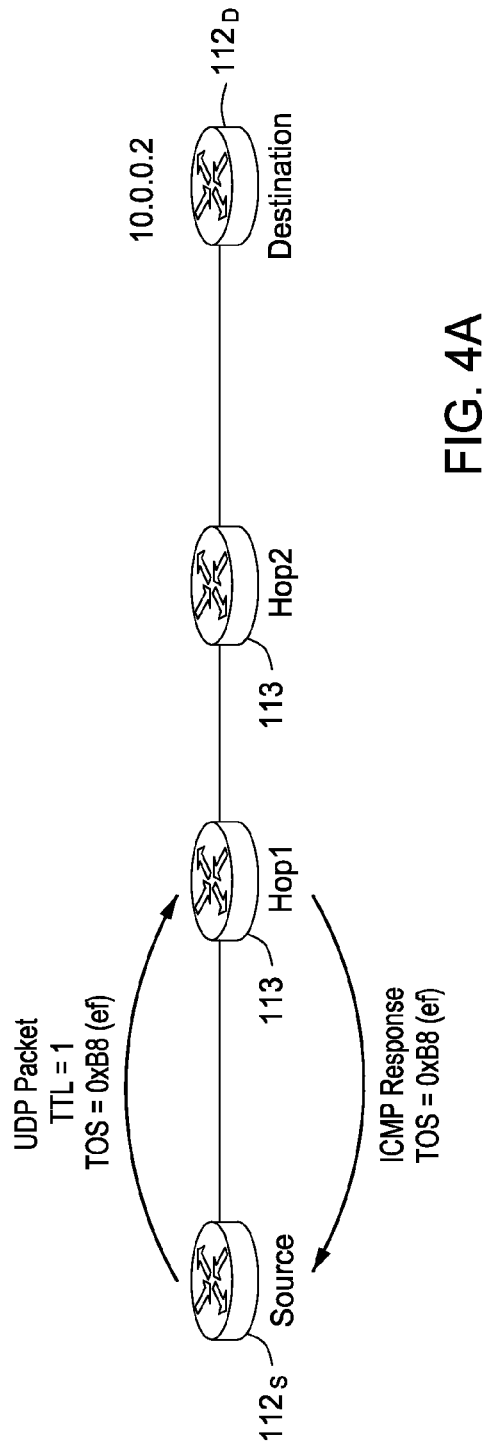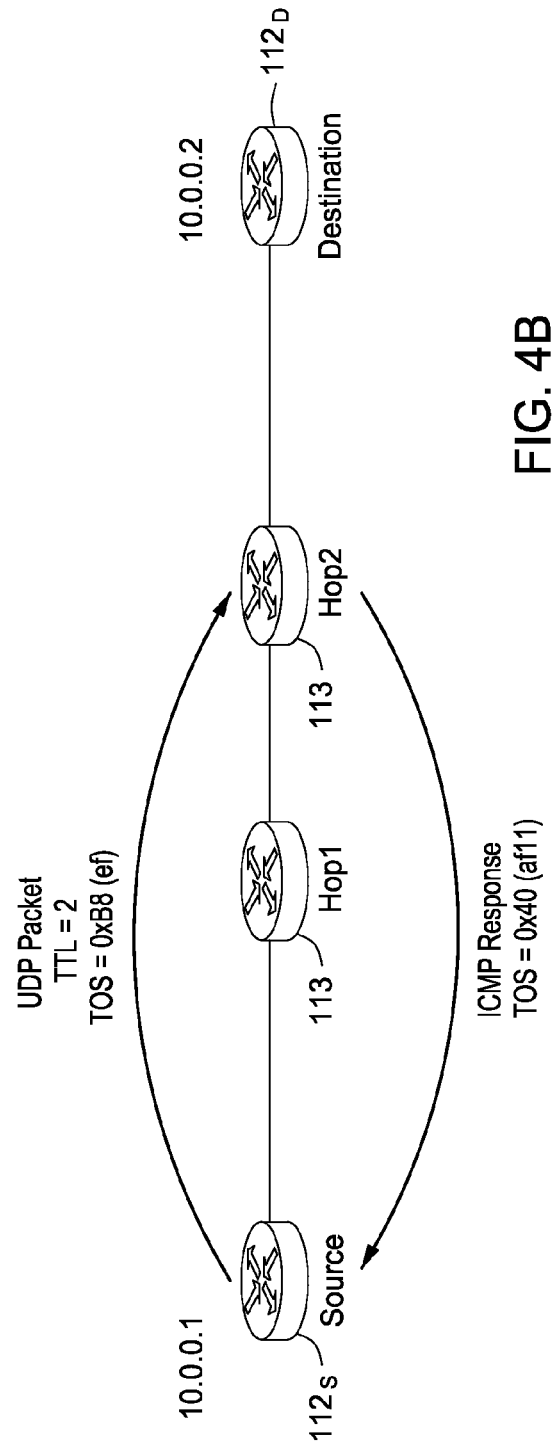

PROBES FOR PREDICTIVE DETERMINATION OF CONGESTION BASED ON REMARKING/DOWNGRADING OF PACKETS

BACKGROUND OF THE INVENTION

1. Field of the Invention

Embodiments of the present invention generally relate to network traffic management.

2. Description of the Related Art

Quality of Service (QOS) generally refers to a measure of performance for a transmission system that reflects its transmission quality and service availability. QOS is a major focus for network service providers, particularly as customers rely on the networks to offer applications that demand high reliability, such as streaming media applications and voice over internet protocol (VOIP) services. For example, for a VOIP connection, the focus is how to ensure packet traffic has a high enough priority to ensure it will not be delayed or dropped due to interference from other lower priority traffic.

In some cases, a priority may be assigned to a packet via a parameter in the packet header that designates a type of service (ToS), also referred to as a class of service (CoS). The ToS parameter may indicate how an upper-layer protocol requires a lower-layer protocol to treat its messages. The ToS field typically acts as a priority field that determines how the packet is handled relative to other packets. In some cases, a network device along a route may downgrade a packet by modifying the ToS field, for example, due to network congestion or as an incorrect re-marking by a service provider. Unfortunately, if the packet is downgraded by modifying the ToS, the packet may not have the same priority. As a result, there may be some delay in delivery of the packet, which may adversely affect the service, for example resulting in audible echoes in a VOIP application.

Accordingly, what is needed is a technique for detecting network congestion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A, 3B and 3C illustrate a portion of the example topology of FIG. 1A, during operations for detecting the downgrading of packets.

FIGS. 4A and 4B illustrate identifying a particular network that has re-marked a packet ToS.

DESCRIPTION OF EXAMPLE EMBODIMENTS

Embodiments of the present invention allow for detecting when packets have been downgraded. For some embodiments probes may be deployed that are configured to automatically detect the downgrading of packets, for example, by sending carefully crafted packets from a source to a destination designed to allow detection of a change (or re-marking) of a Type of Service (ToS). The packets may be designed to elicit an error response from the destination that includes an indication of the ToS of the packets as received at a target destination. Upon receipt of the error response, the probe may compare the ToS in the packets sent to the ToS received in the error responses to detect ToS re-marking indicating the downgrading of packets. While embodiments will be described with reference to operations performed by probes, those skilled in the art will recognize that the same or similar operations may be performed by some other component or manually (e.g., via a command line interface or CLI).

In any case, the downgrading of packets may indicate the occurrence of network congestion or may be serve a predictor of network congestion. In some cases, the downgrading of packets may be expected, for example, when a service provider mechanism (e.g., a policer) downgrades packets if a contracted allocated budget is exceeded. However, frequent or maintained downgrading of packets may indicate a misconfiguration of a QoS policy at a network hop, causing packets to be erroneously mis-marked. For some embodiments, after detecting a re-marking between a source and destination, the probe may then initiate further diagnostic operations to identify a particular hop in a route between the source and destination that is re-marking the ToS. For some embodiments, probes may be configured to send diagnostic information gathered to a network management system (NMS) for further analysis. For some embodiments, the NMS may be configured to poll the probes for the diagnostic information.

As used herein, the term re-marking generally refers to the adjusting of a field in a header of a packet, such as the ToS field. As used herein, the term hop generally refers to the passage of a data packet between two network nodes (for example, between two routers). In some cases, the number of hops a packet must traverse (the "hop count") is used as a routing metric to measure the distance between a source and a destination.

An Example Network Architecture

Figure 1A:
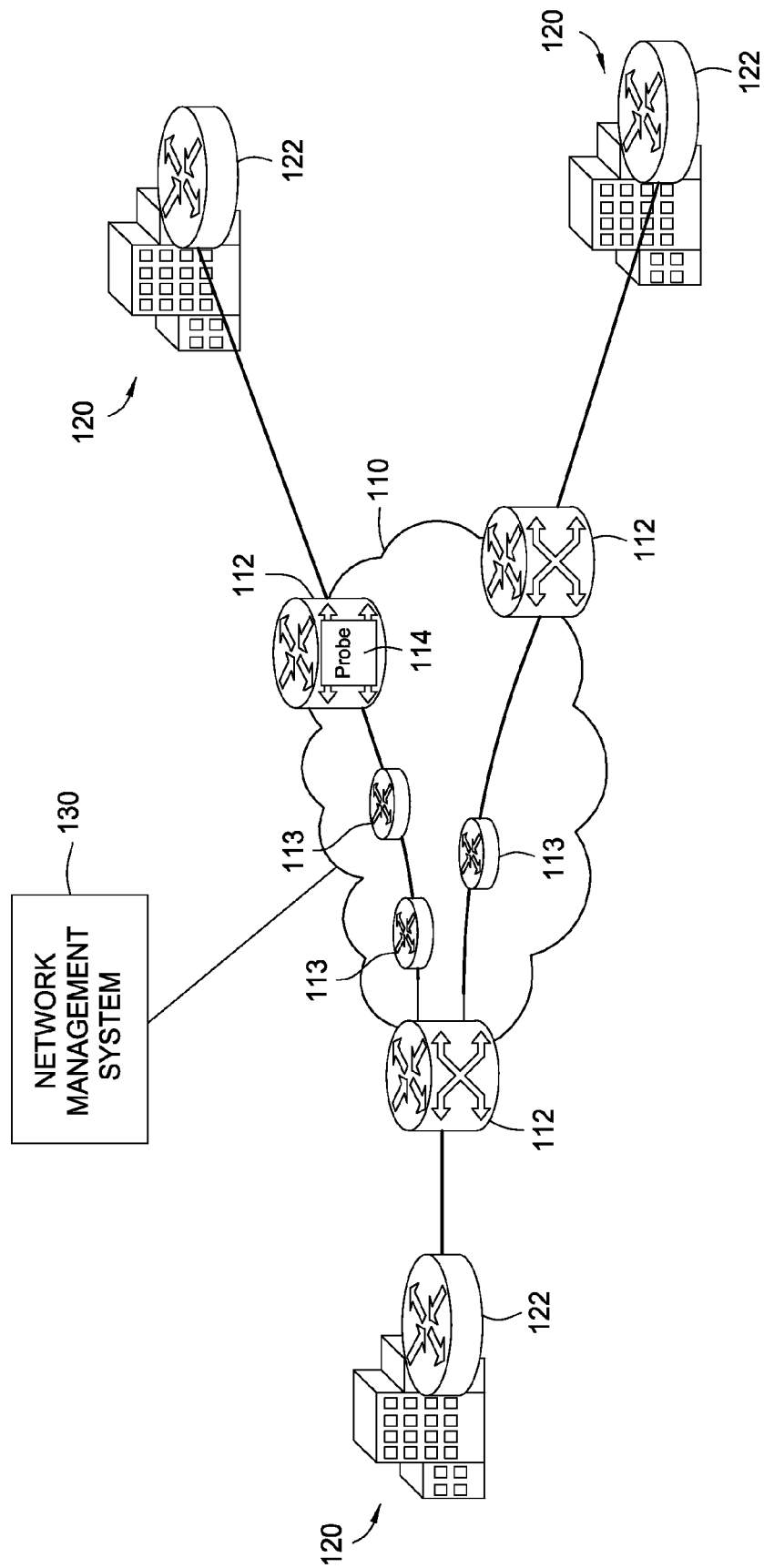
FIG. 1A illustrates an example network topology in accordance with embodiments of the present invention.

FIG. 1A illustrates one example of a network architecture in which embodiments of the present invention may be utilized. The network generally includes a service provider network 110 that routes network traffic (e.g., of data, voice, and the like) between various customer sites 120. As illustrated, the customer sites 120 may connect to the service provider network 110 via customer edge (CE) routers 122 connected to provider edge (PE) routers 112 that are part of the provider network 110. As illustrated, the provider network 110 may also include a "fabric" of intermediate network nodes 113, such as switches and routers, that route and support traffic between the PE routers 112.

For some embodiments, the service provider network 110 may be a Multiprotocol Label Switching (MPLS) network that forwards internet protocol (IP) traffic using labels. These labels may instruct the routers and the switches in the provider network 110 where to forward packets as they are routed between PE routers 112 en route to CEs 122 at the customer sites 120 based on pre-established IP routing information.

The sites 120 may include sites from different business entities, as well as multiple sites from the same business entity (e.g., regional branch offices and headquarters). In the illustrated example, multiple sites for a first hypothetical business entity "Acme, Inc." and a single site for a second hypothetical business entity "Another, Inc." are shown.

A network management system (NMS) 130 may be configured to monitor performance of the provider network 110, as traffic is exchanged over the network. The NMS 130 may be implemented, for example, at a network operation center and may communicate with agents deployed in the provider network in an effort to help track network performance and the general health of network resources. The NMS 130 may communicate with network probes 114 deployed in the network.

For example, a network probe 114 may be deployed in the network to actively generate and monitor network traffic to gather information indicative of network performance. The network probe 114 may be implemented on an existing network device, such as a PE router 112, as shown, or in dedicated devices. The traffic generated may be designed to travel the same path as other traffic on various connections, for example, via a known set of nodes 113. Thus, the connectivity of specific portions of a switching path, such as PE-to-PE connections and/or PE-to-CE connections, may be monitored.

As will be described herein, for some embodiments, probes 114 may be configured to help monitor network traffic by detecting the re-marking of packets. The probes 114 may also be configured to identify a device (node) along a network route that is re-marking packets. Results of probe operations may be kept internally and accessed by the NMS 130 via polling, for example, using information about the device contained in a Management Information Base (MIB) Database. Alternatively, the probe 114 may be configured to automatically send a network trap (alarm) to the NMS 130, upon detection of a significant event, such as a sustained level or re-marking above a specified threshold amount. The trap may also identify a network device that has been re-marking packets and/or a network location where re-marking has occurred. In response, the NMS may notify a network administrator, for example via a graphical user interface (GUI) alarm or e-mail.

Detecting Traffic Congestion with Probes

Depending on the particular embodiment, a number of different techniques may be utilized to detect the re-marking of packets and/or predict congestion using probes 114. As an example, an MIB at a PE router 112 could be polled in an effort to identify what proportion of egress traffic at the PE router 112 has been downgraded. An analysis of the proportion of egress traffic that is downgraded at one or more PE routers 112 may provide a good indication of the bandwidth requirements of a particular service.

Trace-route operations may utilize an IP hop-count setting to incrementally determine the marking at each hop. Thus, a message is generated not when a timeout period is exceeded, rather when a specified hop-count is exceeded. Thus, a probe performing trace-route operations may start by sending a packet with a hop count of 1 to find the marking at the next-hop. The probe may then send another packet with a hop count of 2 to find the marking at the subsequent hop. By doing this, the probe may systematically determine which hop (or series of hops) is remarking packets.

For some embodiments, a probe 114 may be configured to utilize a packet that is designed to elicit some other type of response that provides some indication of network status along a route, such as a packet designed to elicit a port-unreachable Internet Control Message Protocol (ICMP) error from a targeted endpoint or target node. Examination of responses to such a packet (which may be referred to as a "ping QoS") may allow a check of Quality of Service (QoS) marking along a route by providing an indication of the ToS field in the packet header as received at the target. A comparison of the ToS in the packet header as sent by the source to the ToS field in the header as received at the target may identify a re-marking of the ToS at some hop between the source and target. Sustained re-marking of the ToS field in packets may be indicating network congestion or predict network congestion is likely to occur.

Figure 1B:
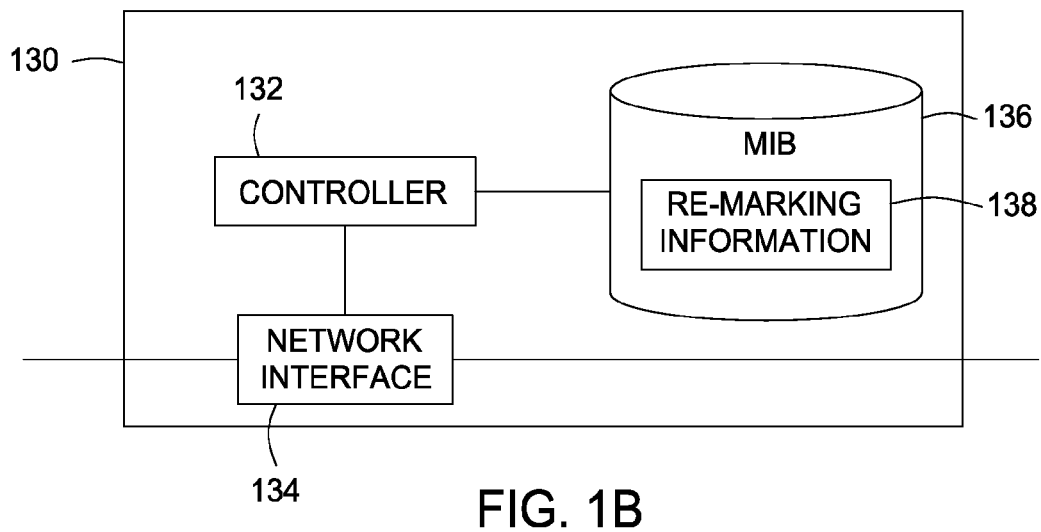
FIG. 1B illustrates an example network apparatus in accordance with embodiments of the present invention.

FIG. 1B illustrates an example network apparatus 130 (e.g., a router) configured to detect packet re-marking in accordance with embodiments of the present invention. As illustrated, the apparatus 130 may include a controller 132 configured to process packets sent/received on one or more ports of a network interface 132. The controller 132 may include a processor and memory containing instructions for performing operations described herein, for example, including the operations 200 described below with reference to FIG. 2. For some embodiments, the controller 132 may store information 136 indicative of detected packet re-marking of packets in an MIB 134. Depending on the embodiment or particular configuration, the MIB 134 may be polled by a NMS to obtain the re-marking information 136 or the controller 132 may automatically send the re-marking information 136 to the NMS.

Figure 2:
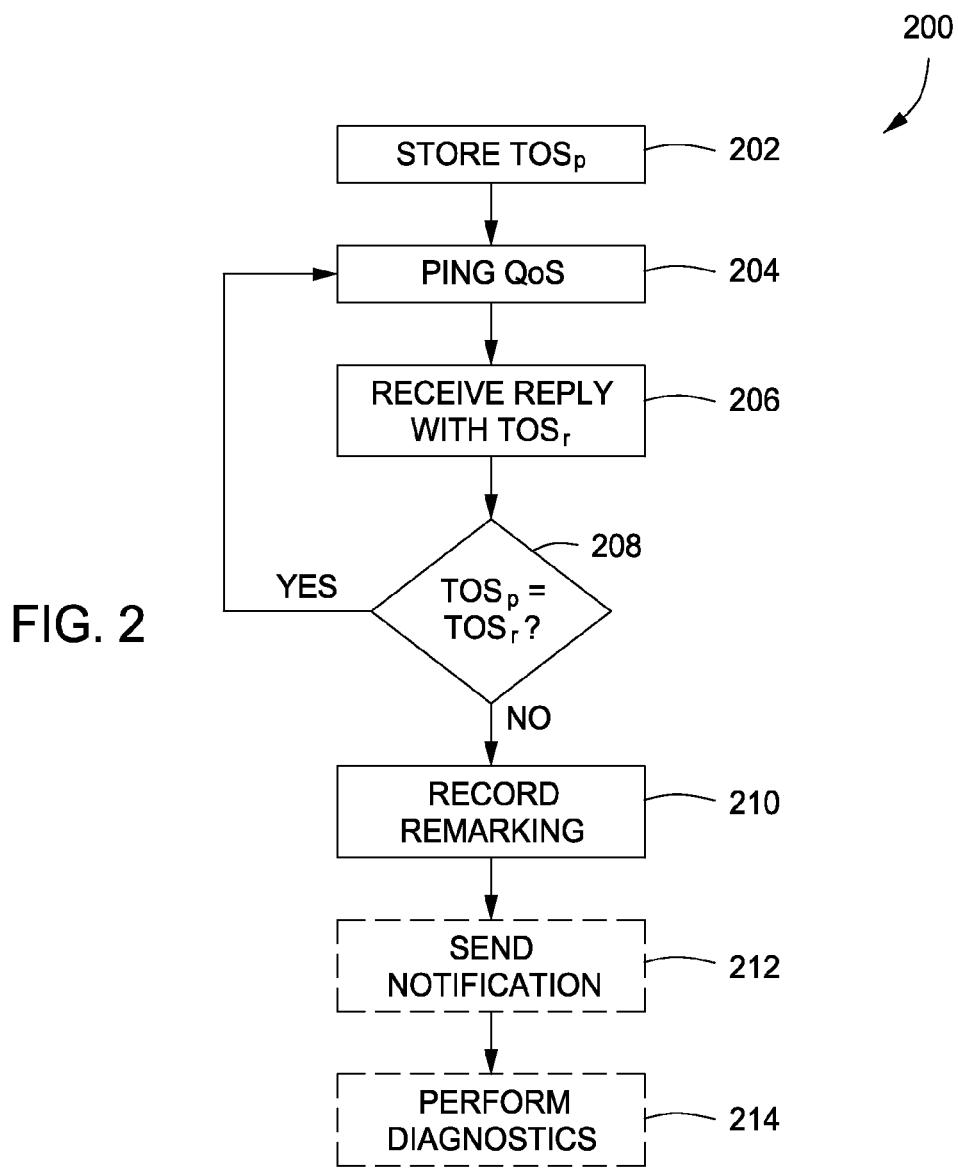
FIG. 2 is a flow diagram of example operations in accordance with embodiments of the present invention.

FIG. 2 is a flow diagram of an example of operations 200 that illustrate utilizing ping QoS packets to detect the re-marking of ToS fields in packets. The operations 200 may be performed, for example, on a probe 114 deployed on a network device, such as a described with reference to FIGS. 3A-3C, which illustrate components in an exemplary network route including two network nodes 113 between a source $112_S$ and destination $112_D$. While the example shows only two nodes 113 to facilitate understanding, the operations may be applied to much more complex routes with many more nodes. The operations 200 may be performed automatically, for example, at a predetermined rate to monitor traffic or may be performed on demand, for example, as prompted by the NMS 130 or even via command line interface (CLI) commands.

Figure 3A:
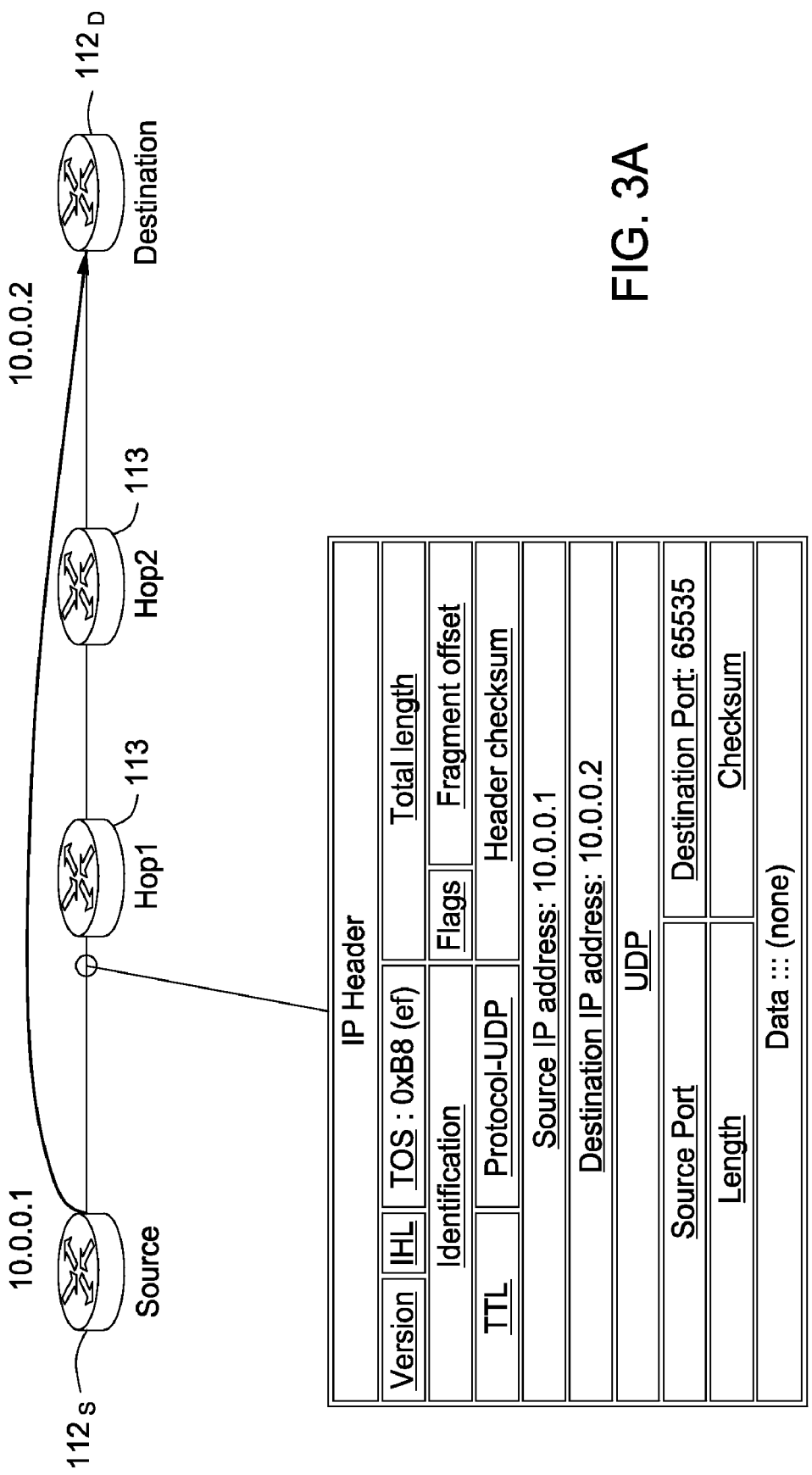

The operations 200 begin, at step 202, by storing a current ToS at the source $112_S$ ($ToS_S$) that will be included in the header of a ping QoS packet, sent at step 204. As illustrated in FIG. 3A, a header of the ping QoS packet sent from source node $112_S$ may contain the ToS (0×B8), an address of the source node $112_S$ (10.0.0.1), address of the destination $112_D$ (10.0.0.2), and a destination port address. The destination port address may be intentionally set to a port address (e.g., 65535) not supported by the destination in order to elicit an "unreachable port" error response.

Figure 3B:
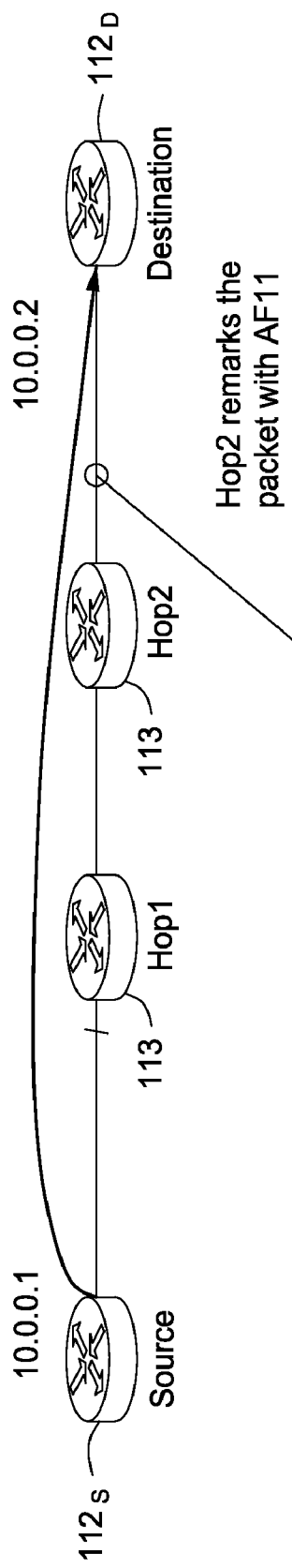

As illustrated in FIG. 3B, at a second node 113 between the source an destination, the ToS may of the ping QoS packet may be re-marked (e.g., from 0×B8 to 0×40). The re-marking may be the result of misconfiguration at the second node or congestion between the second node and the destination $112_D$. In any case, the destination node $112_D$ will receive the ping QoS packet with the re-marked ToS ($ToS_R$).

Because the ping QoS packet targets an invalid destination port, the destination node $112_D$ will generate an unreachable port error response. As illustrated in FIG. 3C, the error response will include an indication of the ToS as received at the destination node $112_D$. As illustrated, the entire header of the packet as received may be copied as data in the error response and sent back to the source node $112_S$.

Referring back to FIG. 2, the source node $112_S$ receives the error response, at step 206. At step 208, the source node compares the TOS sent in the ping QoS packet ($ToS_P$) to the ToS received in the error response (ToS$_R$). A mismatch indicates a re-marking, which may be recorded, at step 210. For some embodiments, a notification of the re-marking may be sent (e.g., to the NMS 130), at step 212. The notification may be sent only after some sustained amount of remarking has been detected, for example, with some predetermined percentage of packets being remarked over some period of time. Some services like VoIP should never have remarked packets. Thus, if remarking is detected in a VoIP application, a notification may be sent immediately.

At step 214, diagnostics may be performed, for example, performing operations in an effort to identify a source of the detected re-marking. These operations may involve sending "trace-routing" packets from the source node 112$_S$ designed to elicit responses from different nodes 113 along the route to the destination node 112$_D$.

For example, packets may be sent from the source node designed to elicit "time exceeded error messages" from different nodes along the network path. In some cases, a packet header may have a Time To Live (TTL) field, which specifies how long the datagram is allowed to "live" on the network, in terms of router hops. Each router may decrement the value of the TTL field (reducing it by one) prior to transmitting the packet. If the TTL field drops to zero, the datagram is assumed to have taken too long a route (exceeding its time to live) and an error response may be sent. If ToS information is contained in the error response, this mechanism may be used to detect a location where the re-marking of packets is occurring by "walking" hops through a network route.

For example, as illustrated in FIG. 4A, to determine if the first node 113 is re-marking the ToS, a ping packet may be sent from the source node 112$_S$ with a TTL of one. When this TTL is decremented to zero at the first node, an ICMP response message may be sent, and the original IP header (which contains the TOS as received) is placed in the data of the response ICMP message. In this example, the ToS sent in the ping packet (0×B8) matches the ToS received in the response, indicating no re-marking.

To test for remarking between the first and second nodes, a ping packet may be sent from the source node 112$_S$ with TTL set to two. The TTL will be decremented to one at the first node 113 and decremented to zero at the second node 113. Thus, an error response will be sent containing the ToS as received at the second node 113. In this example, the ToS sent in the ping packet (0×B8) does not match the ToS received in the response (0×40), indicating re-marking at some point between the first and second node.

For some embodiments, these "route walking" operations may be initiated once a re-marking between a source and destination is detected. They may be initiated automatically or on-demand, at the request of the NMS 130. This approach is efficient, in that network bandwidth is not consumed sending the multiple ping packets to different route locations. For some embodiments, however, these operations may be performed as the primary technique for detecting packet ToS re-marking.

For some embodiments, packet ToS re-marking may be detected via a multicasting mechanism. For example, a multicast group may be established for a set of network devices (e.g., PE routers 112) between which traffic will be monitored. The set of devices may join the group (e.g., utilizing an ICMP join) and "advertise" that they will receive messages with a common multicast group address. For some embodiments, when devices are added to the network, they may join an appropriate multicast group if they are to be monitored. If they are not to be monitored, a network administrator may decide to keep the devices from joining the group. For some embodiments, the decision whether or not to join may be made as part of device configuration, for example, via a graphical user interface (GUI) or command line interface (CLI).

To detect remapping, a ping QoS packet targeting the multicast group may be sent from a source. The ToS in the response received from multiple members of the group may be compared to the ToS in the ping QoS packet to detect packet re-marking along a corresponding route.

Figure 5:
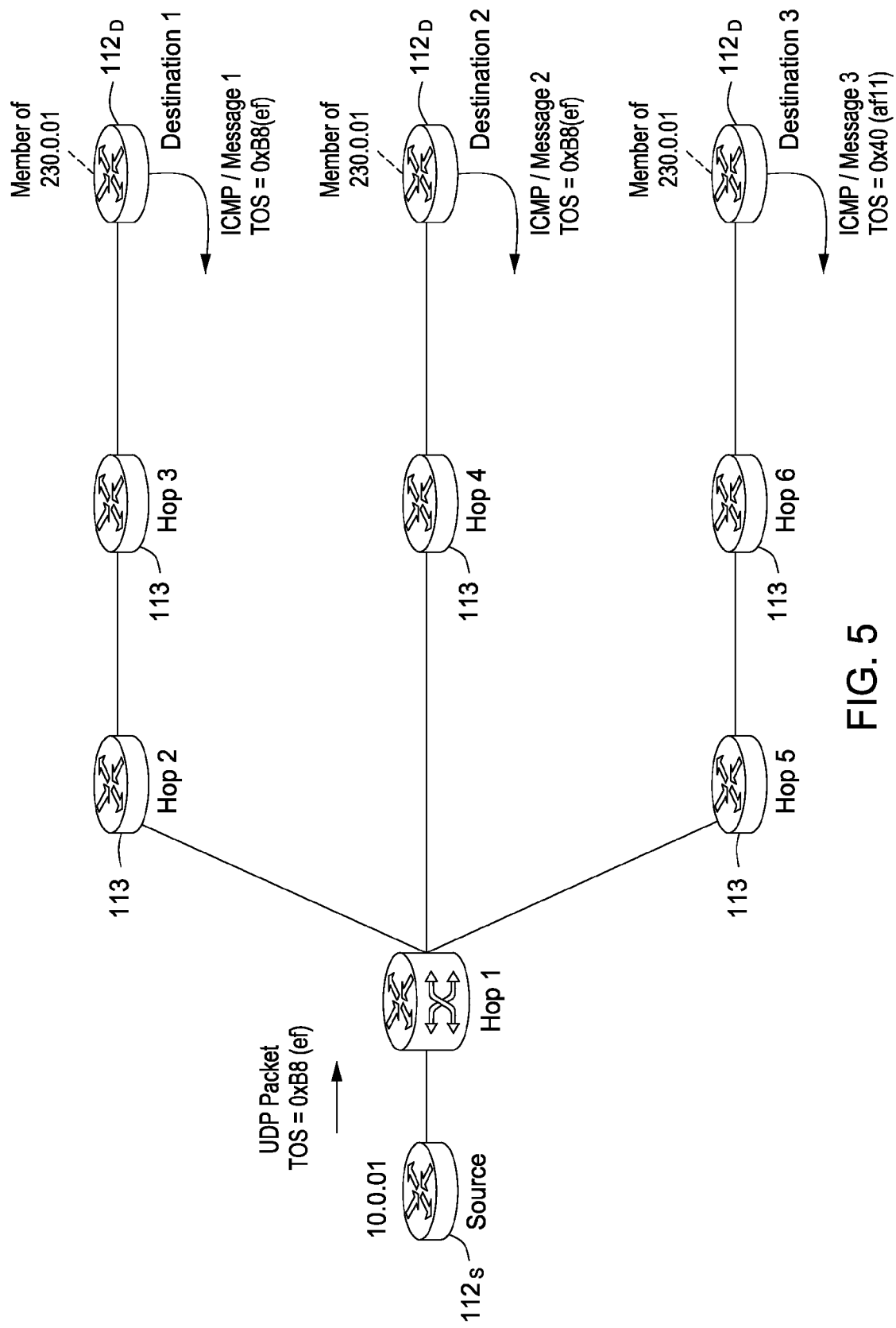
FIG. 5 illustrates detecting the downgrading of packets utilizing a ping QoS packet targeting a multicast group.

This is illustrated in FIG. 5, which shows multiple paths between a source device 112$_S$ and multiple destinations devices 112$_D$ that are members of a multicast group (230.0.0.1). The source device 122$_S$ sends a ping QoS packet targeting the multicast group, with the packet including a ToS of (0×B8). In the illustrated example, the first and second destination devices send error responses indicating a received ToS (0×B8) that matches the ToS sent in the QoS ping packet which indicates no re-marking.

The third destination device, however, sends an error response with a ToS (0×40) that does not match the ToS sent in the QoS ping packet, indicating a re-marking. Further operations, such as those described above with reference to FIGS. 4A and 4B, may be performed to identify a particular location between the source device 112S and the third destination that caused the re-marking.

For some embodiments, a probe on a destination device that sends an error response indicating a packet re-marking may perform similar operations described above to test for remarking in the return path. For example, when deploying probes, the probes at both ends of a path may be configured to perform the operations described above. The actual number and particular location of probes deployed will vary depending on the application needs, for example, based on how detailed the traffic flow is to be monitored, the size of the network, and the like. A greater density of probes may be deployed in particular areas of focus, for example, critical areas or areas where historical data indicates a high incidence of network congestion.

While the foregoing is directed to embodiments of the present invention, other and further embodiments of the invention may be devised without departing from the basic scope thereof, and the scope thereof is determined by the claims that follow.

What is claimed is:

1. A method comprising:
sending an Internet Protocol (IP) request packet comprising a header portion and a payload portion, wherein the header portion contains a first type-of-service indication effecting how the IP packet is to be handled relative to other IP packets;
receiving an IP response packet to the IP request packet, the IP response packet containing an indication of a second type-of-service indication in the IP request packet as received by a network device that sent the IP response packet;
comparing the first and second type-of-service indications;
determining that the IP request packet was re-marked with a different type-of-service indication in the header portion of the IP request packet if the first and second type-of-service indications do not match; and
in response to determining that a threshold level of re-marking has been reached, automatically performing an operation to identify a network device that is re-marking the IP request packet, the operation comprising:
sending a first request with a first time-to-live indication to a first intermediate network device;

comparing a type-of-service indication sent with the first request to a type-of-service indication as received in the first request by the first intermediate device; and determining that the IP request packet was re-marked by a second intermediate device that precedes the first intermediate device if the type-of-service indication sent with the first request does not match the type-of-service indication as received in the first request by the first intermediate device.

2. The method of claim 1, further comprising sending a notice to a network management system, wherein the notice identifies the network device that is re-marking the IP request packet.

3. The method of claim 2, wherein the network management system is configured to, upon receiving the notice, automatically notify a network administrator.

4. The method of claim 1, further comprising, in response to determining that the type-of-service indication sent with the first request matches the type-of-service indication as received in the first request by the first intermediate device:

sending a second request with a second time-to-live indication different than the first time-to-live indication to a second intermediate network device;

comparing a type-of-service indication sent with the second request to a type-of-service indication as received in the second request by the second intermediate device; and determining that the IP request packet was re-marked with a different type-of-service indication in the header portion of the IP request packet prior to receipt by the second intermediate device if the type-of-service indication sent with the second request does not match the type-of-service indication as received in the second request by the second intermediate device.

5. The method of claim 1, wherein the request is designed to elicit an error response by targeting an invalid port of the network device that sends the error response.

6. The method of claim 1, further comprising creating a probe on a network device to send the IP request packet, receive the IP response packet and compare the first and second type-of-service indications.

7. The method of claim 1, wherein the IP request packet targets members of a multicast group.

8. The method of claim 1, further comprising storing information regarding re-marking of IP packets in a management information base (MIB).

9. The method of claim 8, further comprising sending information regarding re-marking of IP packets stored in the MIB to a network management system in response to a polling request from the network management system.

10. An apparatus, comprising:
an interface for establishing communication with a network; and
a controller configured to:
send an Internet Control Message Protocol (ICMP) request packet comprising a header portion and a payload portion and targeting a destination device on the network;
compare a first type-of-service indication as contained in the header portion of the ICMP request packet to a second type-of-service indication as received in the ICMP request packet by the destination device to determine where the ICMP request packet was re-marked with a different type-of-service indication in the header portion of the ICMP request packet; and
in response to determining that a threshold level of re-marking has been reached, automatically performing an operation to identify a network device that is re-marking the ICMP request packet, the operation comprising:
sending a first request with a first time-to-live indication to a first intermediate network device;
comparing a type-of-service indication sent with the first request to a type-of-service indication as received in the first request by the first intermediate device; and
determining that the IP request packet was re-marked by a second intermediate device that precedes the first intermediate device if the type-of-service indication sent with the first request does not match the type-of-service indication as received in the first request by the first intermediate device.

11. The apparatus of claim 10, wherein the controller is further configured to send results of the comparing to a network management system.

12. The apparatus of claim 10, wherein the controller is configured to send ICMP request packets targeting devices belonging to different multicast groups.

13. The apparatus of claim 11, wherein the network management system is configured to, upon receiving the results, automatically notify a network administrator.

14. The apparatus of claim 10, wherein the ICMP request packet is designed to elicit an error response by targeting an invalid port of the destination device.

15. The apparatus of claim 10, further comprising:
a management information base; and
wherein the controller is further configured to store information regarding re-marking of packets in a management information base (MIB).

16. A system, comprising:
at least one probe deployed on at least one network device in a network, the probe configured to:
detect re-marking of Internet Protocol (IP) packets with a different type-of-service indication in a header portion of the IP packets by comparing a type-of-service indication sent in an Internet Control Message Protocol (ICMP) request packet targeting a destination device to a type-of-service indication in the ICMP request packet as received by the destination device;
in response to determining that a threshold level of re-marking has been reached, automatically performing an operation to indicate one or more network devices that are re-marking the ICMP request packet, the operation comprising:
sending a first request with a first time-to-live indication to a first intermediate network device;
comparing a type-of-service indication sent with the first request to a type-of-service indication as received in the first request by the first intermediate device; and
determining that the IP request packet was re-marked by a second intermediate device that precedes the first intermediate device if the type-of-service indication sent with the first request does not match the type-of-service indication as received in the first request by the first intermediate device; and
a network management component configured to obtain the indication of re-marking of IP packets by the one or more network devices based on information received from the probe.

17. The system of claim 16, wherein the network management component is configured to poll the probe for the information.

18. The system of claim 16, wherein the probe is configured to automatically send the information when the threshold level of re-marking has been reached.

19. The system of claim 16, wherein the network management component is configured to notify an administrator of the network in response to obtaining the indication of re-marking of IP packets.

20. The system of claim 19, wherein the network management component is configured to notify the administrator by providing the administrator with a location in the network where the re-marking occurred.

21. The system of claim 16, wherein the information provides an indication of a network device that is re-marking IP packets.

22. An apparatus, comprising:
  means for establishing communication with a network;
  means for sending an Internet Control Message Protocol (ICMP) request packet targeting a destination device on the network and comparing a first type-of-service indication as sent in the ICMP request packet to a second type-of-service indication as received in the ICMP request packet by the destination device; and
  means for, in response to determining that a threshold level of re-marking has been reached, automatically performing an operation to identify a network device that is re-marking the ICMP request packet, the operation comprising:
    sending a first request with a first time-to-live indication to a first intermediate network device;
    comparing a type-of-service indication sent with the first request to a type-of-service indication as received in the first request by the first intermediate device; and
    determining that the IP request packet was re-marked by a second intermediate device that precedes the first intermediate device if the type-of-service indication sent with the first request does not match the type-of-service indication as received in the first request by the first intermediate device.

* * * * *